United States Patent [19]

Dietle et al.

[11] Patent Number: 6,007,105
[45] Date of Patent: Dec. 28, 1999

[54] SWIVEL SEAL ASSEMBLY

[75] Inventors: Lannie Dietle; Manmohan S. Kalsi, both of Houston, Tex.

[73] Assignee: Kalsi Engineering, Inc., Sugar Land, Tex.

[21] Appl. No.: 09/018,261

[22] Filed: Feb. 4, 1998

Related U.S. Application Data

[60] Provisional application No. 60/037,486, Feb. 7, 1997.

[51] Int. Cl.$^6$ ........................................... F16L 7/00
[52] U.S. Cl. .............................. 285/94; 285/98; 285/276; 285/281; 285/330; 285/351; 285/900; 277/559
[58] Field of Search ..................... 285/281, 276, 285/98, 351, 94, 330, 900; 277/423, 559

[56] References Cited

U.S. PATENT DOCUMENTS

| | | | |
|---|---|---|---|
| 1,432,109 | 10/1922 | King | 285/281 |
| 2,185,822 | 1/1940 | Young | 285/98 X |
| 2,253,932 | 8/1941 | Gilkerson | 285/281 X |
| 2,394,800 | 2/1946 | Murphy | 285/94 |
| 2,459,472 | 1/1949 | Tremolada | 285/94 X |
| 2,608,385 | 8/1952 | Stahl | 285/98 X |
| 2,770,475 | 11/1956 | Rafferty | 285/251 X |
| 3,929,340 | 12/1975 | Peisker | 277/599 |
| 4,449,738 | 5/1984 | Hotger | 285/98 X |
| 4,754,780 | 7/1988 | Smith | 295/900 X |
| 5,052,720 | 10/1991 | Yoda | 285/900 X |

*Primary Examiner*—Dave W. Arola
*Attorney, Agent, or Firm*—James L. Jackson; Mayor, Day, Caldwell & Keeton L.L.P.

[57] ABSTRACT

A swivel seal assembly is defined for providing sealed high pressure fluid communication between relatively rotatable generally coaxial conduits where dynamic runout and static misalignment may occur to one conduit relative to the other. A generally tubular washpipe is mounted in pivotally articulating relation to one conduit, and a generally tubular seal housing is telescoped over the washpipe and mounted in pivotally articulating relation to the other conduit. High pressure, staged rotary seals are supported by the seal housing and maintain bearing and sealing engagement with the washpipe so that the seal housing and washpipe articulate in unison in response to said static misalignment and dynamic runout, thereby virtually eliminating relative lateral motion between the seal housing and washpipe and minimizing rotary seal extrusion damage. The seal housing and washpipe are hydraulic force balanced regardless of the pressure to which they are subjected, and thus are not subject to pressure induced loads which might otherwise interfere with articulation.

30 Claims, 6 Drawing Sheets

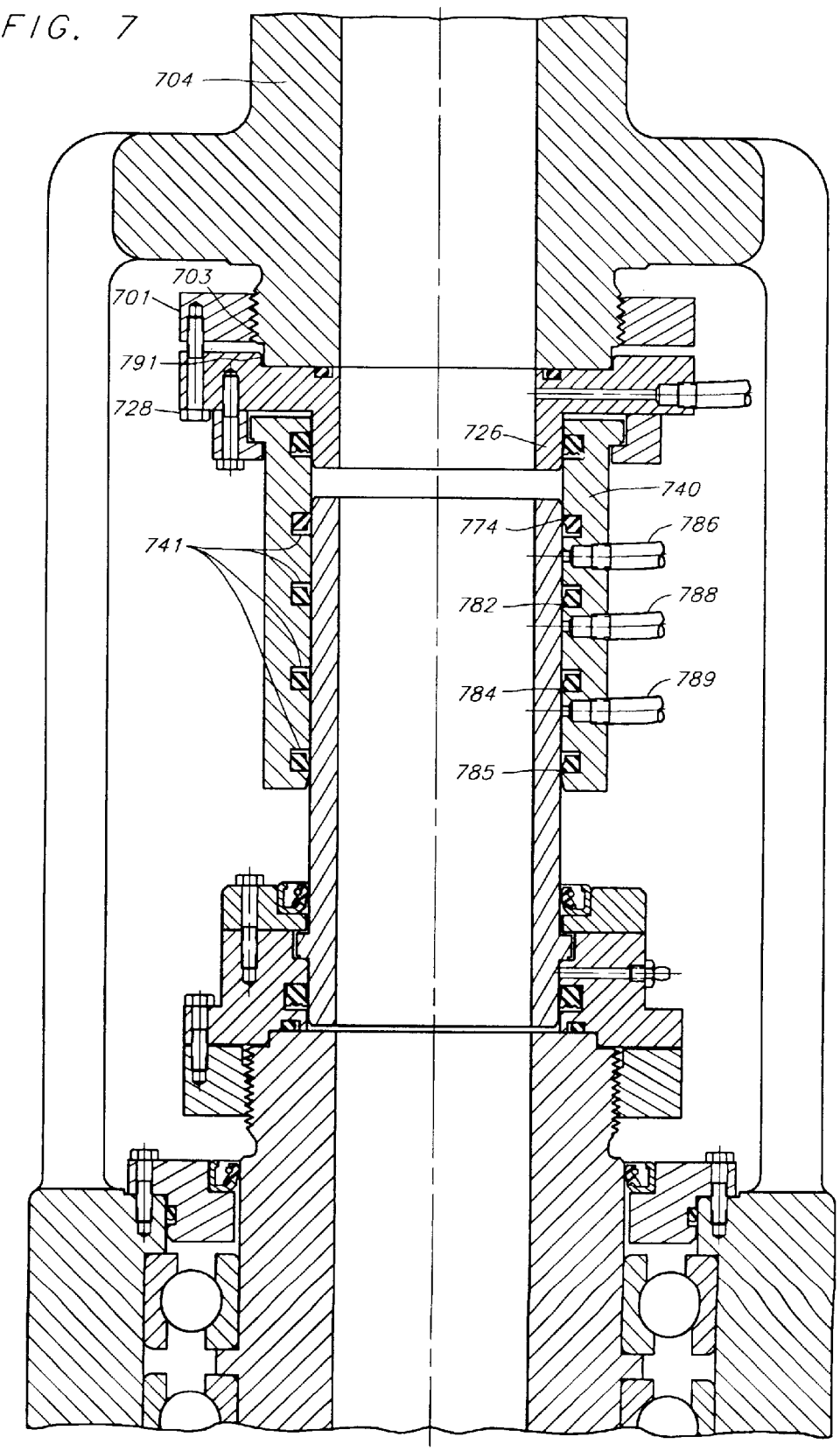

SWIVEL SEAL ASSEMBLY

Applicants hereby claim the benefit of U.S. Provisional Application Ser. No. 60/037,486 filed on Feb. 7, 1997 by Lannie Dietle and Manmohan S. Kalsi and entitled Swivel Seal Assembly.

BACKGROUND OF THE INVENTION

1. Field of the Invention

This invention relates generally to swivel assemblies which are intended to conduct a pressurized fluid such as a liquid or gas between a first conduit and a second conduit which is approximately coaxial with the first conduit and has relative rotation with respect to the first conduit, and which may have dynamic runout relative to the first conduit and may have static offset relative to the first conduit. More particularly, the present invention is directed to a swivel assembly incorporating a unique sealing mechanism which accomplishes hydrodynamic lubricant pumping activity and permits the swivel mechanism to control the flow of high pressure abrasive fluids and to maintain efficient lubrication at the various sealing interfaces thereof and to thus significantly enhance the service life of the swivel mechanism.

2. Description of the Prior Art

Conventional drilling rig swivels use a stack of redundant rotary seals which are typically of a reinforced elastomeric chevron type. These seals run against the relatively rotating hardened surface coating of a washpipe. In most designs the washpipe is stationary, and the seals and their housing rotate. The stack of seals is exposed to the high pressure drilling fluid on one side, and to atmospheric pressure on the other. The stack of seals provides redundancy, but since only one seal at a time is exposed to the high pressure differential between the drilling fluid and atmosphere, the pressure capacity of the unit is limited to that of the weakest link, which is the rotary seal. The high differential pressure causes the seal adjacent to the high pressure to grab tightly against the rotating washpipe, and the high interfacial contact pressure causes a high degree of wear on the washpipe and the seal. The high differential pressure and dynamic runout of the application, and the relatively large clearances required to accommodate the dynamic runout, also cause extrusion damage to the seal which contributes significantly to it's ultimate failure. the Once the first seal fails, the next one in the stack is exposed to the high pressure drilling fluid, and so on until all seals have been consumed by the severe operating conditions. Because of the trend toward higher pressure in oilfield drilling (in some cases 7,500 psi or more), the pressure capacity and service life of conventional swivels is in many instances no longer satisfactory. The majority of drilling swivel failures in the field are the direct result of rotary seal failure, and the non-drilling time required to repair the swivel inflates overall drilling costs.

SUMMARY OF THE INVENTION

It is a principal feature of the present invention to provide a novel swivel seal assembly for swivel mechanisms which employs the advantage of accomplishing seal lubrication during swivel operation to thus promote efficiency and longevity of service thereof;

It is another feature of the present invention to provide a novel swivel seal assembly for swivel mechanisms which utilizes swivel flow passage pressure to develop lubricant pressure that may be different from flow passage pressure for supply of lubricant to annular sealed lubricant regions.

It is an even further feature of the present invention to provide a novel swivel seal assembly incorporating ring-like hydrodynamic sealing elements which provide boundary interference seals between the rotary seal carrier and washpipe of a swivel mechanism for hydrodynamically maintaining a lubricant film in the sealing interface of the sealing elements in response to relative rotation to prevent the typical dry rubbing type wear and blistering heat damage associated with conventional non-hydrodynamic type seals, and thereby prolong swivel seal assembly life and make higher service pressure and higher rotary speed practical.

It is another feature of the present invention to provide a novel swivel seal assembly for swivel mechanisms which employs simple and efficient rotary locking assemblies which prevent relative rotation of the rotary seal carrier with respect to the fixed conduit and prevent relative rotation of the washpipe with respect to the rotary conduit of the swivel mechanism.

The improved swivel seal assembly of this invention discloses the staging of pressure across more than one resilient rotary seal to reduce the severity of seal contact pressure and the severity of seal extrusion damage, and discloses the use of a hydraulic force balanced seal housing and washpipe which articulate in unison together in response to static offset and dynamic runout to permit tight clearance between the seal housing and washpipe and minimize relative motion there-between, thereby minimizing seal extrusion damage, and discloses the use of a hydrodynamically lubricated seal geometry which further extends rotary seal and washpipe life by lubricating the dynamic sealing interface to minimize wear and cause the seals to run cooler. These swivel seal improvements provide the means to retrofit existing swivels so that they are capable of providing the increased pressure capacity and service life now desired by the drilling industry.

BRIEF DESCRIPTION OF THE DRAWINGS

So that the features, advantages, and objects of the present invention are attained and can be understood in detail, a comprehensive description of the invention may be had by reference to the embodiments thereof which are illustrated in the appended drawings. It is to be noted, however, that the appended drawings only illustrate typical embodiments of this invention, and are therefore not to be considered limiting of its scope.

IN THE DRAWINGS

Figure 1:
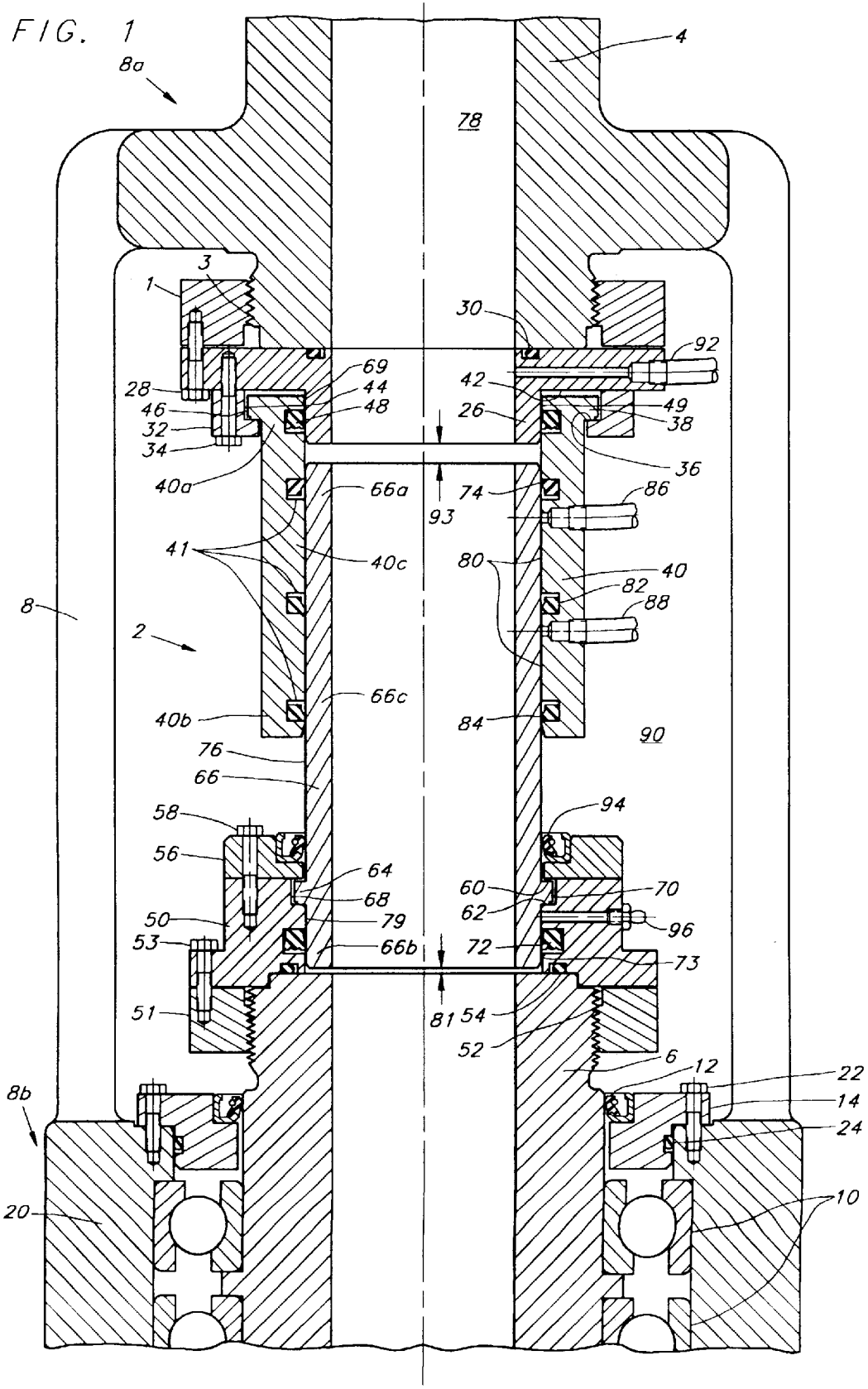
Figure 2:
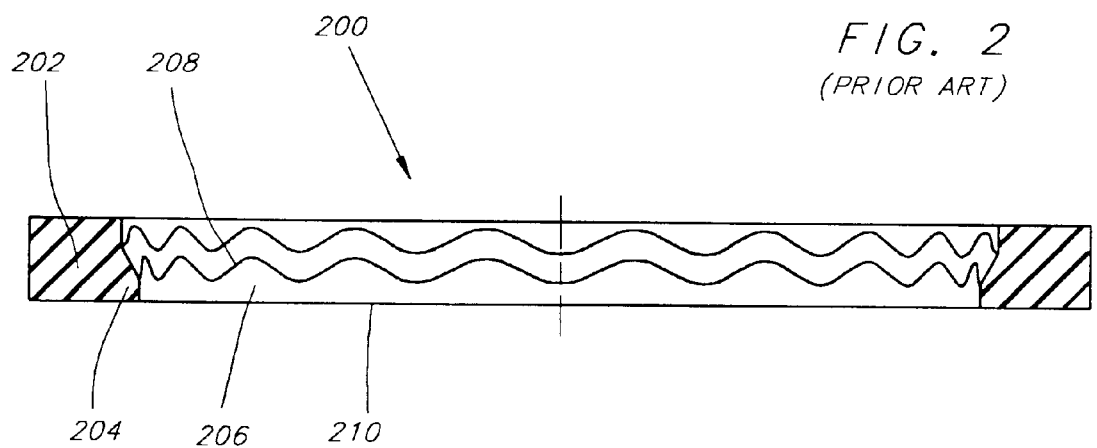
Figure 3:
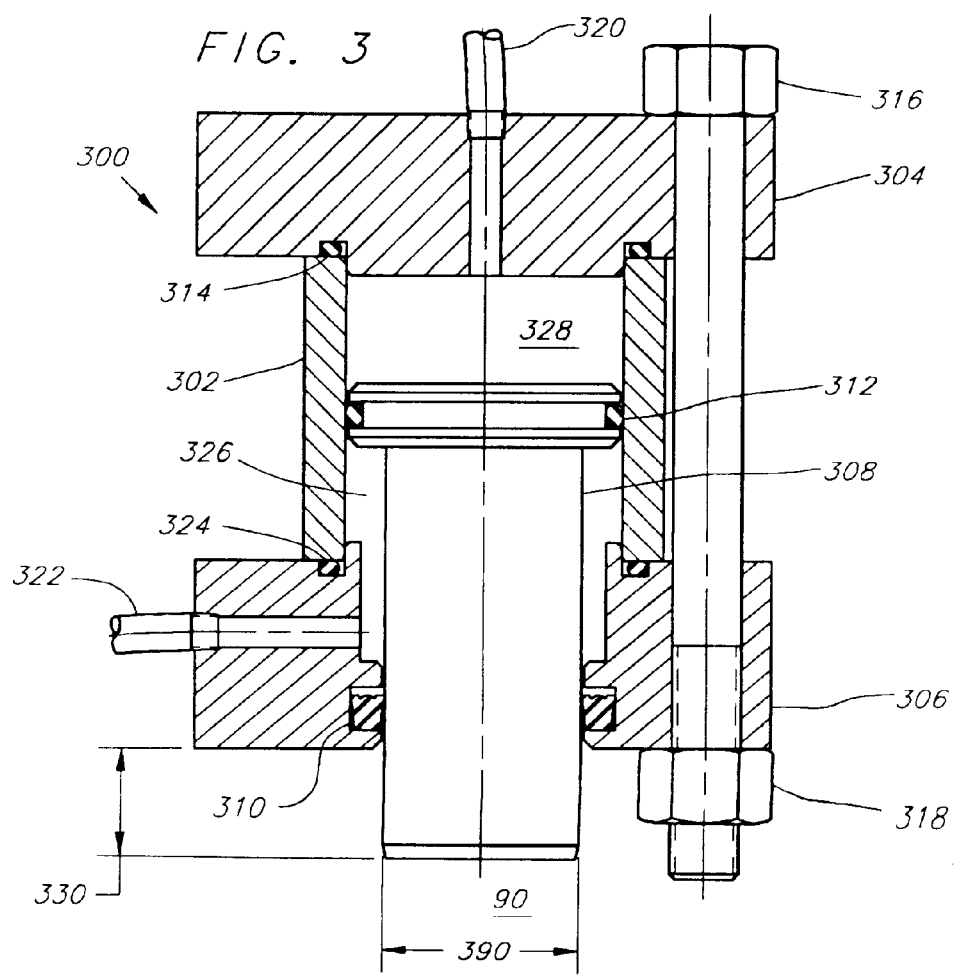
Figure 4:
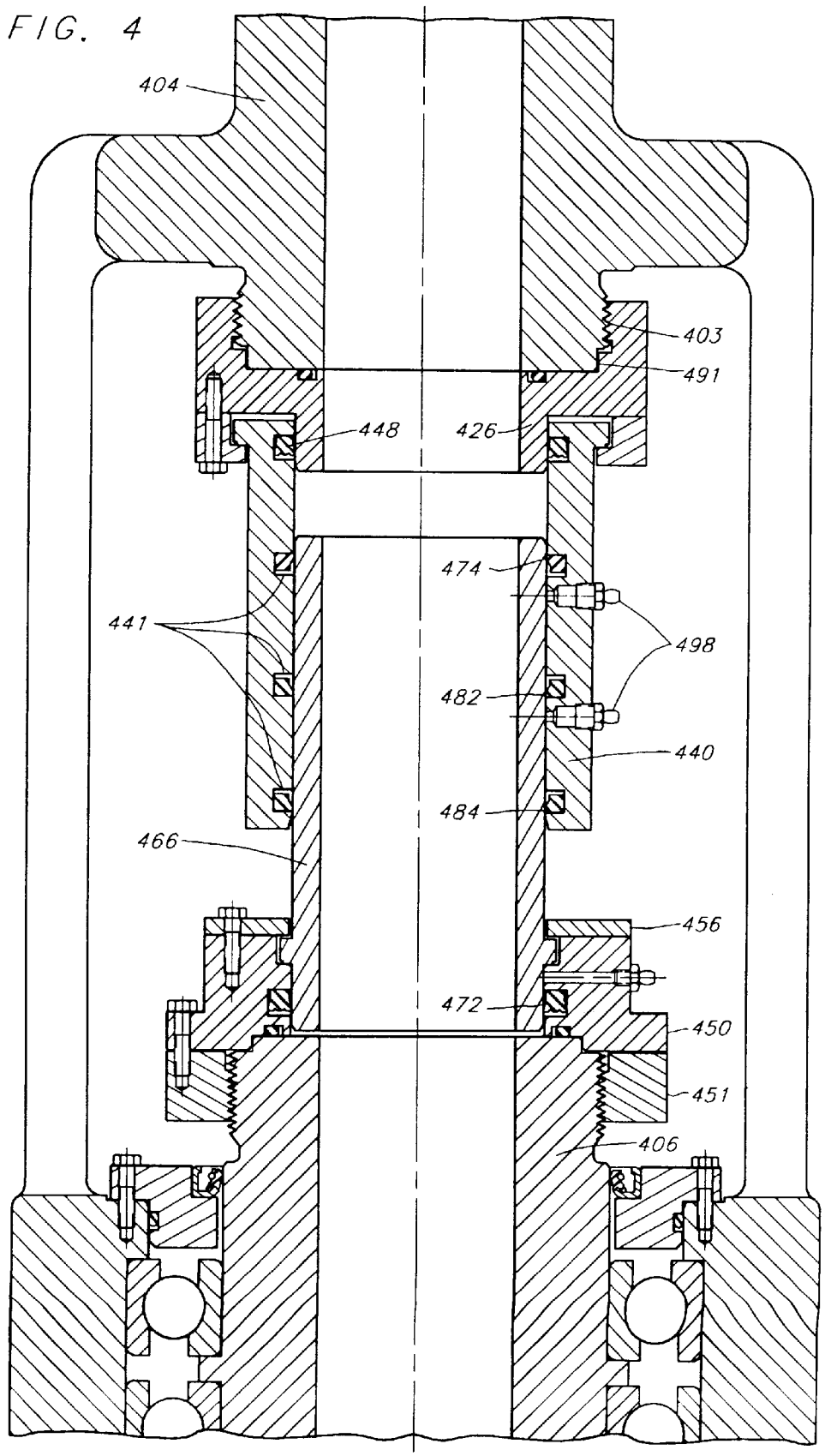
Figure 5:
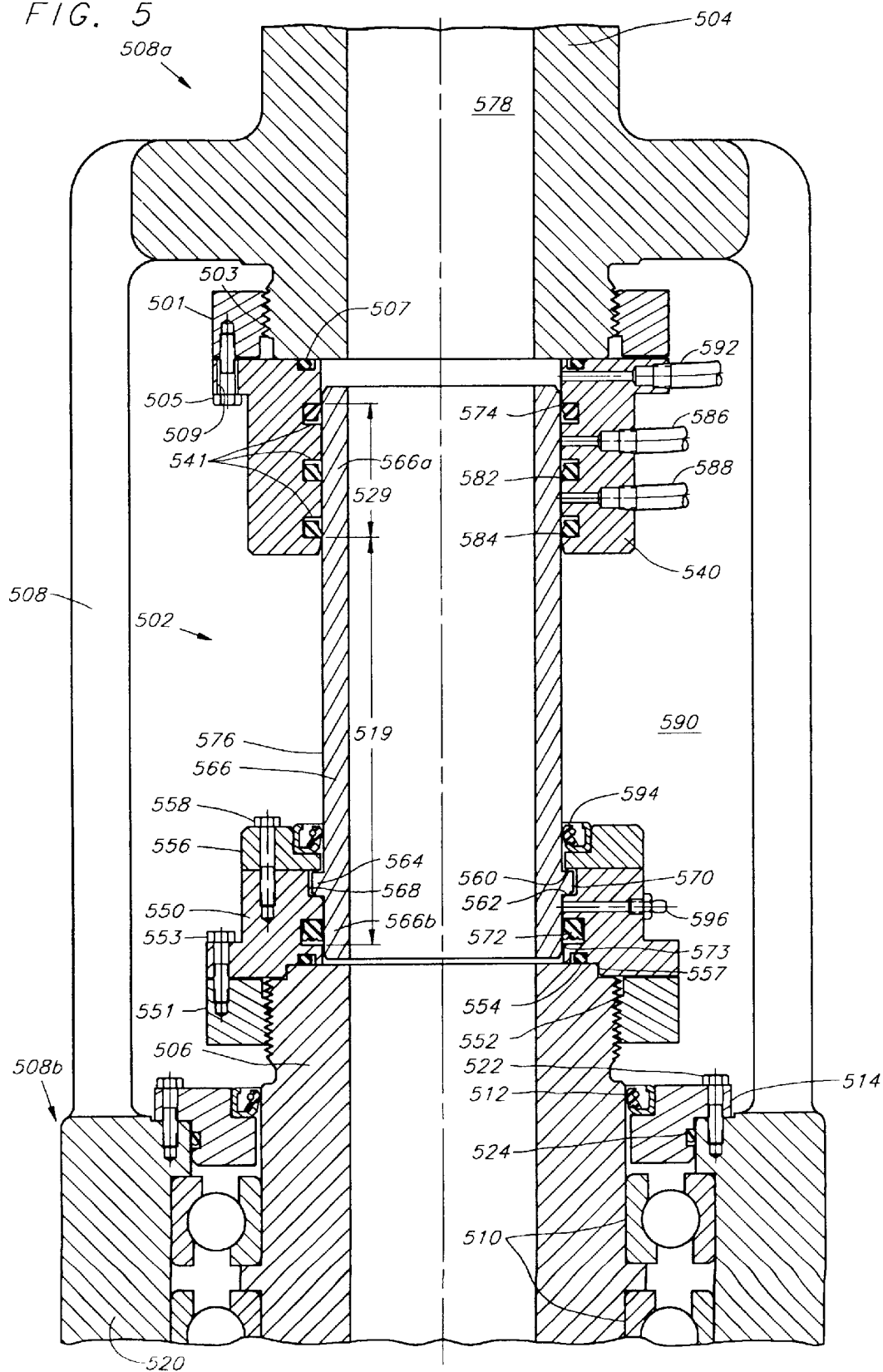
Figure 6:
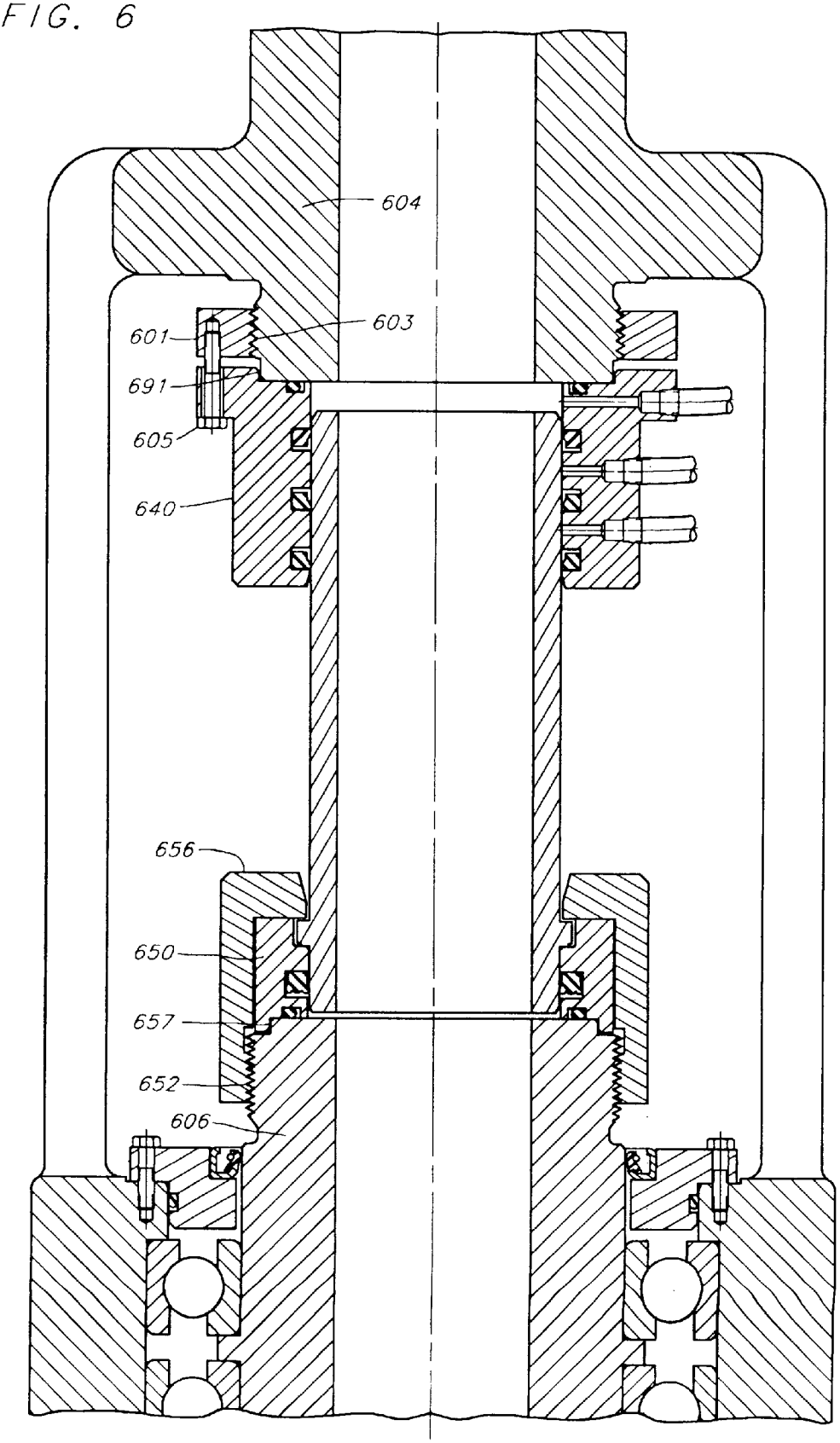

FIG. 1 is a longitudinal cross-sectional illustration representative of the preferred embodiment of the swivel seal assembly in which the seal housing and the washpipe are hydraulic force balanced and thereby free to articulate, and the pressure differential between the fluid and the environment is staged across several resilient rotary seals;

FIG. 2 is a cross-section representative of a prior art hydrodynamic seal which is advantageously applied to the preferred embodiment of the swivel seal assembly;

FIG. 3 is a cross-section of a pressure regulating lubricant reservoir;

FIG. 4 is a cross-sectional illustration representative of a simplified alternate embodiment of the swivel seal assembly in which the seal housing and the washpipe are hydraulic force balanced and free to articulate, and in which redundant non-staged resilient rotary seals are provided;

FIG. 5 is a cross-sectional illustration representative of a simplified alternate embodiment of the swivel seal assembly in which the rotary seal housing is fixed, and the washpipe alone is hydraulic force balanced and free to articulate, and the pressure differential between the fluid ind the environment is staged across several resilient rotary seals;

FIG. 6 is a cross-sectional illustration representative of a simplified alternate embodiment of the swivel seal assembly in which the seal housing is fixed and piloted to the first conduit, and the washpipe alone is hydraulic force balanced and free to articulate, and the pressure differential between the fluid and the environment is staged across several resilient rotary seals; and FIG. 7 is a cross-sectional illustration representative of a simplified alternate embodiment of the swivel seal assembly in which the seal housing and the washpipe are hydraulic force balanced and free to articulate, and the pressure differential between the fluid and the environment is staged across several resilient rotary seals, and the housing pilot is piloted to the first conduit.

DETAILED DESCRIPTION OF PREFERRED EMBODIMENT

The preferred embodiment of the present invention is shown generally at 2 in the longitudinal section view of FIG. 1. The invention is intended to be used in an apparatus commonly known as a swivel to conduct a pressurized fluid such as a liquid or gas, also referred to herein as a process fluid, between a first conduit 4 and a second conduit 6 which is approximately coaxial with first conduit 4 and has relative rotation with respect to first conduit 4, and which may have dynamic runout relative to first conduit 4 and which may have static offset relative to first conduit 4. An example of such an apparatus is an oil field drilling swivel, which conducts highly pressurized abrasive drilling fluid from a non-rotating hose to a rotating drillstring.

A fragmentary portion of a drilling swivel is shown in FIG. 1 to aid in understanding the present invention. It should be borne in mind that the particular swivel that is illustrated in FIG. 1 is not intended to limit the spirit and scope of the present invention, as the present invention is equally suitable for use in other types of fluid conducting swivels, including any type of apparatus wherein a second conduit is approximately co-axial with respect to a first conduit, and wherein said second conduit has relative rotation with respect to said first conduit.

The fragmentary portion of the drilling swivel shown in FIG. 1 includes as major components a frame 8, the second conduit 6, bearings 10, an oil seal 12, and an oil seal housing 14. The frame 8 incorporates a first end shown generally at 8a and a second end shown generally at 8b. The first end 8a of frame 8 incorporates said first conduit 4, and the second end 8b of frame 8 incorporates a bearing housing portion 20 which provides radial and axial support to bearings 10, which in turn provide radial and axial support to second conduit 6 to support second conduit 6 for rotation with respect to frame 8. In some swivels first conduit 4 is integral with frame 8, and in other swivels first conduit 4 is separable from frame 8 and retained by threaded means, such as a pattern of bolts. In the oilfield, the first conduit is commonly called a "gooseneck". Oil Seal 12 is supported and positioned by a frictional fit with oil seal housing 14, and is used to retain oil within bearing housing portion 20 to lubricate bearings 10 and to exclude contaminants such as dust which may be present in environment 90. The oil seal housing 14 is retained to bearing housing portion 20, such as by threaded fastener 22. The oil seal housing 14 has a sealed relationship with bearing housing portion 20 by virtue of seal 24.

The two main components of the swivel seal assembly of the present invention are the seal housing 40 and the washpipe 66. The seal housing 40 is of generally tubular, enlongate form, and has a first end 40a which faces first conduit 4, and a second end 40b which faces second conduit 6 and telescopes over first end 66a of washpipe 66. The washpipe, which is also of enlongate, generally tubular form, has a first end 66a which faces first conduit 4, and a second end 66b which faces second conduit 6. The seal housing 40 incorporates means to position and support resilient rotary seals for dynamic sealing engagement with external washpipe external cylindrical sealing surface 76, such as the grooves 41 shown which contain resilient rotary seals 74, 82 and 84. The washpipe 66 and at least a portion of seal housing 40, including second end 40b, are laterally translatable in response to lateral excursion of second conduit 6 resulting from dynamic runout and static offset of second conduit 6.

An adapter ring 1 is attached to first conduit 4 by means which can take any suitable form, such as the threads 8 usually provided on the first conduit of a drilling swivel. A housing pilot 26 of the present invention is fixedly attached to adapter ring 1 by means which can take any suitable form such as the a circle of bolts 28 illustrated, and has a scaled relationship with first conduit 4 by virtue of seal 30 which can be an O-ring or other suitable seal, said housing pilot effectively becoming a removable extension of said first conduit.

Housing pilot 26 can if desired be adjusted laterally with respect to first conduit 4 when circle of bolts 28 is loosened, thus providing a means to align housing pilot 26 with second conduit 6 in order to accommodate static misalignment between first conduit 4 and second conduit 6. Oversized bolt clearance holes are provided in housing pilot 26 for bolts 28 in order to permit the seal housing 40 to be adjusted to a position which is concentric to first conduit 6. lousing pilot 26, housing retainer 32, and seal housing 40 can also be angularly adjusted to position the flexible conduits 86, 88 and 92 as desired to clear frame 8. Although the preferred embodiment shown in FIG. 1 incorporates a housing pilot which is laterally and angularly adjustable, such is not intended to limit the present invention in any mannier whatever. The housing pilot could also be constructed integrally with the first conduit, or connected to the first conduit with a pattern of bolts, without departing from the spirit of the invention. If the housing pilot was constructed integrally with the first conduit, however, a larger clearance would be required at 93 for assembly and disassembly.

Housing retainer 32 is fixedly attached to housing pilot 26 by threaded means 34 which may be a circle of bolts as shown or other suitable means. Internal shoulder 36 of housing retainer 32 and surface 42 of housing pilot 26 cooperate together to capture rim 38 of seal housing 40 and thereby axially position seal housing 40. The distance between internal shoulder 36 and surface 42 is greater than the axial thickness of rim 38 so that the housing can articulate within the clearance provided.

Internal polygonal geometry 44 of housing retainer 32 interlocks with external polygonal geometry 46 of rim 38 and thereby rotationally connects and constrains seal housing 40 to housing retainer 32 such that seal housing 40 is not rotatable relative to frame 8. Other interlocking geometry, such as splines or a drive pin and slot or a tang and mating slot, may also be used to rotationally connect seal housing 40 to housing retainer 32 without departing from the spirit or scope of the present invention. The interlocking geometry to rotationally constrain seal housing 40 can alternately be incorporated into the housing pilot without departing from the spirit or scope of the invention. Radial clearance is provided between the seal housing and the housing pilot and between the seal housing and the housing retainer so that the washpipe can articulate within the clearance provided.

The first end 40a of seal housing 40 has a sealed relationship with housing pilot 26 by virtue of flexible seal 48, which establishes a sealing interface with housing pilot 26 at cylindrical sealing surface 49 and positions the first end 40a of seal housing 40 in approximately concentric orientation with housing pilot 26, and defines first pressure responsive area of seal housing 40. The pressure responsive area is defined in relation to the pressure of fluid 78. Although flexible seal 48 is shown installed and positioned by a groove located in first end 40a seal housing 40, it can be appreciated that flexible seal 48 could alternatively be installed in a groove located in housing pilot 26 and seal against the bore of seal housing 40a to position the first end 40a of seal housing 40 in approximately concentric orientation with housing pilot 26, and to define first pressure responsive area of seal housing 40.

An adapter ring 51 is attached to second conduit 6 by threaded means 52 which can take any suitable form, such as the threads usually provided on the second conduit of a drilling swivel. A washpipe pilot 50 is provided which is fixedly attached adapter ring 51 and clamped against second conduit 6 by means which may take any suitable form such as a pattern of bolts 53, and has a sealed relationship with second conduit 6 by virtue of seal 54, which can take any suitable form, such as a gasket or O-Ring, said washpipe pilot effectively becoming a removable extension of said second conduit. Although the preferred embodiment shown in FIG. 1 incorporates a washpipe pilot which is retained to second conduit 6 by virtue of being connected to an adapter ring by a pattern of bolts, such is not intended to limit the present invention in any manner whatever. The washpipe pilot can be constructed integral to second conduit 6, or connected to second conduit 6 with a pattern of bolts or other means, or the functions of the washpipe pilot and adapter ring can be integrated into one component, without departing from the spirit of the invention. If the washpipe pilot was constructed integrally with the second conduit, however, or if the functions of the washpipe pilot and adapter ring were integrated into one component, a larger clearance would be required at 93 for assembly and disassembly.

Washpipe retainer 56 is fixedly attached to washpipe pilot 50 by means which may take any suitable form such as circle of bolts 58. Internal shoulder 60 of washpipe retainer 56 and surface 62 of washpipe pilot 50 cooperate together to capture rim 64 of washpipe 66 and thereby axially position washpipe 66. The distance between internal shoulder 60 and surface 62 is greater than the axial thickness of rim 64 so that the washpipe can articulate within the clearance provided.

Internal polygonal geometry 68 of washpipe pilot 50 interlocks with external polygonal geometry 70 of rim 64 and thereby rotationally connects washpipe 66 to washpipe pilot 50 for rotational driving of the washpipe such that the washpipe 66 is relatively rotatable relative to frame 8. Other interlocking geometry, such as splines or a drive pin and mating slot, or a tang and mating slot, may also be used to rotationally connect washpipe 66 to washpipe pilot 50 without departing from the spirit or scope of the present invention. The interlocking geometry to rotationally drive washpipe 66 can alternately be incorporated into the washpipe pilot without departing from the spirit or scope of the invention. Radial clearance is provided between the washpipe and the washpipe pilot, and between the washpipe and the washpipe retainer so that the washpipe can articulate within the clearance provided.

Seal housing 40 has a sealed relationship with washpipe 66 by virtue of resilient rotary seal 74, which establishes a dynamic rotary sealing interface with washpipe 66 at washpipe external cylindrical sealing surface 76, and which defines a second pressure responsive area of seal housing 40 and a first pressure responsive area of washpipe 66. The pressure responsive areas, are defined in relation to the pressure of fluid 78.

Washpipe 66 has a sealed relationship with washpipe pilot 50 at second end 66b by virtue of flexible seal 72, which establishes a sealing interface with washpipe 66 at washpipe cylindrical sealing surface 73 and positions the second end 66b of washpipe 66 in approximately concentric orientation with washpipe pilot 50, and defines second pressure responsive area of washpipe 66. The pressure responsive areas are defined in relation to the pressure of fluid 78. Washpipe pilot 50 is also mechanically piloted to second conduit 6 at 57. The second end 66b of washpipe 66 is therefore positioned in approximately concentric relation with concentric conduit 6. Although flexible seal 72 is shown installed and positioned by a groove located in washpipe pilot 50, it can be appreciated that flexible seal 72 could alternatively be installed in a groove located in washpipe 66 and seal against the bore of washpipe pilot 50 to position the second end 66b of washpipe 66 in approximately concentric orientation with washpipe pilot 50, and define second pressure responsive area of washpipe 66.

Since washpipe 66 is rotationally connected to washpipe pilot 50, and seal housing 40 is rotationally connected to housing retainer 32, washpipe 66 has relative rotation with respect to seal housing 40 whenever second conduit 6 has relative rotation with respect to first conduit 4.

As stated above, seal housing 40 has a sealed relationship with washpipe 66 by virtue of resilient rotary seal 74, which establishes a dynamic rotary sealing interface with washpipe 66 at washpipe external cylindrical sealing surface 76. Resilient rotary seal 74 thereby prevents the escape of fluid 78 which is at pressure P1. In the typical installation, P1 is greater than P4 and P4 is negligible, but installations are possible where P4 is higher than P1. Resilient rotary seals 82 and 84 are provided which also establish respective dynamic rotary sealing interfaces with washpipe 66 at washpipe external cylindrical sealing surface 76. A lubricant at pressure P2 is introduced through flexible conduit 86 to the sealed annular region between resilient rotary seal 74 and resilient rotary seal 82, and a lubricant at pressure P3 is introduced through flexible conduit 88 to the sealed annular region between resilient rotary seal 82 and resilient rotary seal 84. The flexible conduits can conveniently take the form of hydraulic hoses. It can be appreciated that although flexible conduits are shown as the means to introduce staging pressure between the seals, other means, such as cross-drilled holes, may be used without departing from the spirit or scope of the invention. The pressures P2 and P3 are staged so that the pressure difference between fluid 78 and environment 90 is divided among two or more of the resilient rotary seals 74, 82 and 84. Since resilient rotary seals 74, 82 and 84 all seal at the same diameter; i.e. the diameter defined by sealing surface 76, the pressures P2 and P3 do not impose an unbalanced hydraulic force on either the seal housing 40 or the washpipe 66.

For a first example, assuming pressure P1 of fluid 78 is greater than the pressure P4 of environment 90, if lubricant pressure $P2=P1-(P1-P4)\times\frac{1}{3}$ and lubricant pressure $P3=P1-(P1-P4)\times\frac{2}{3}$, each one of the resilient rotary seals 74, 82 and 84 will be exposed to a pressure drop which is only $\frac{1}{3}$ of the differential pressure between P1 and P4, thereby reducing seal interfacial contact pressure and seal extrusion damage compared to the prior art. Pressure P1 may be sensed at conduit 92.

For a second typical example, assuming pressure P1 of fluid 78 is greater than the pressure P4 of environment 90, and assuming fluid 78 may contain abrasive matter, lubricant pressure P2 can be held slightly higher than fluid pressure P1 so that resilient seal 74 is held straight and circular by the differential pressure between fluid pressure P1 and lubricant pressure P2, as is desirable for hydrodynamic seals of the type shown in FIG. 2. If lubricant pressure P3 is then set at (P2−P4)/2, resilient rotary seals 82 and 84 will be exposed to a pressure drop which is only ½ of the difference between P1 and P2, and also approximately ½ of the difference between P1 and P4. From the above descriptions, it can be appreciated that any magnitude of pressure differential between fluid pressure P1 and environment pressure P4 can be accommodated by providing a suitable number of pressure stages so that the pressure drop across any one seal stage is compatible with the pressure capacity of the seal being used. For example, 3 pressure stages of 2,500 psi capacity could be used to seal a 7,500 psi differential, and 4 stages of 2,500 psi capacity could be used to seal a 10,000 psi differential.

For a final example, assuming pressure P4 of environment 90 is greater than pressure P1 of fluid 78, if lubricant pressure P3=P4−(P4−P1)×⅓ and lubricant pressure P2=P4−(P4−P1)×⅔, each one of the resilient rotary seals 74, 82 and 84 will be exposed to a pressure drop which is only ⅓ of the difference between P1 and P4.

The use of pressure staging reduces the severity of seal contact pressure against the washpipe, thereby reducing the severity of seal and washpipe wear compared to the prior art, and providing a swivel assembly which is capable of sealing much higher pressures than the prior art. The reduction of severity of seal contact pressure against the washpipe provided by the pressure staging also permits contact pressure which is compatible with the use of hydrodynamic seals, which further extend rotary seal and washpipe life, and provides the swivel with the capability to handle even higher pressures, by lubricating the dynamic sealing interface. Contact pressure at the seal to shaft interface is one of the most important factors relating to hydrodynamic performance of a hydrodynamic seal because it influences film thickness, however the extremely high swivel service pressures desired today create seal contact pressure which is incompatible with satisfactory performance of current hydrodynamic seals unless the staging taught by the present invention is employed.

When a condition of elevated lubricant pressure exists across a resilient seal in a drilling swivel, the hydrostatic force resulting from the lubricant pressure acting over the area between the static sealing interface and the dynamic sealing interface drives the seal against the environment side gland wall. At some level of elevated lubricant pressure, the portion of the seal adjacent to extrusion gap between the washpipe and the seal housing begins to locally bulge or protrude in to the extrusion gap. This phenomenon is commonly called "extrusion" by the seal industry. The magnitude of extrusion is directly dependent upon several factors, including the size of the extrusion gap, the lubricant pressure, and the modulus of the seal material, which decreases with temperature. In high pressure sealing applications such as swivels, extrusion can lead to severe fatigue damage known as "nibbling" or "extrusion damage", which causes seal material loss and thereby significantly reduces the operational life of the seal. Extrusion damage is caused by cyclic stressing of the seal material which protrudes into the extrusion gap, which ultimately causes the protruding material to fatigue and break away from the sealing element.

The cyclic stress which causes extrusion damage in prior art swivels is largely the result of dynamic fluctuations in the size of the extrusion gap due to runout, which causes high variations in the radial compression of the extruded material. Continuing material loss from extrusion related fatigue damage can ultimately lead to seal failure. In the present invention, as described in detail below, extrusion damage is minimized by permitting the seal housing and the washpipe to pivotally articulate in unison in response to dynamic runout so that runout induced variations in the size of the extrusion gap are minimized.

When hydrodynamic rotary seals are employed in the present invention, the added extrusion resistance provided by seal housing and washpipe articulation provides means which improve long term hydrodynamic lubrication by counteracting several film degradation actions, as follows. The propagation of extrusion damage across the peripheral sealing surface (206 on FIG. 2) physically disrupts the hydrodynamic lubricant film. The resulting frictional heat further disrupts the film by reducing lubricant viscosity and by promoting heat embrittlement and film disruptive cracking of the peripheral sealing surface, and further reduces extrusion resistance by lowering the overall modulus of elasticity of the seal. Because of the improved extrusion resistance of the present invention, extrusion damage propagation and embrittlement induced crack propagation across the peripheral sealing surface is minimized, providing for adequate film thickness to be maintained so that running temperature is moderated, which also moderates temperature related modulus of elasticity loss. The added extrusion resistance of the assembly therefore provides means for controlling and maintaining the thickness of the film of lubricant between the peripheral sealing surface and the relatively rotatable counter-surface 76 of the washpipe. The loss of material due to extrusion damage can also cause the hydrodynamic geometry (208 on FIG. 2) to become distorted as pressure driven extrusion feeds portions of the dynamic lip through the extrusion gap. This volume-loss distortion effect, if severe, can negatively affect the film thickness and cause the seal to run hotter. The improved extrusion resistance of the present invention minimizes extrusion related distortion of the hydrodynamic geometry, therefore the film thickness is better maintained, permitting ithe seal to run cooler over the long term. When extrusion damage is sustained, the high frequency of compression, flexing and tearing of the extruded material also generates substantial heat which negatively affects film thickness and modulus of elasticity; the improved extrusion resistance of the present invention minimizes this effect. The invention therefore provides means for controlling and maintaining hydrodynamic wedging of the film of lubricant and controlling and maintaining the thickness of the film of lubricant between the peripheral sealing surface and the relatively rotatable surface of the washpipe by virtue of minimizing extrusion damage and by minimizing distortion of the hydrodynamic geometry. The articulation in unison between the washpipe and seal housing of the present invention also prevents skew induced abrasive impingement type wear which can damage the peripheral sealing surface of the dynamic lip and inhibit proper lubrication.

Since washpipe cylindrical sealing surface 73 and washpipe external cylindrical sealing surface 76 are substantially equal in diameter, resilient rotary seal 74 and flexible seal 72 define substantially equal and opposite acting first and second pressure responsive areas (as described above), whereby opposed pressure induced hydraulic forces acting axially and oppositely on washpipe 66 are substantially balanced and thus the washpipe 66 is thus not subject to substantial hydraulic loads that would otherwise interfere with motion, and is thus readily pivotally articulatable regardless of the pressure P1 of the fluid 78 or the pressure P4 of environment 90 so that washpipe 66 can pivot at flexible seal 72 in response to dynamic runout of second conduit 6, and in response to static misalignment between conduit 4 and conduit 6. Although the washpipe to pilot extrusion gap clearance at 79 is relatively small to achieve good extrusion resistance, the axial engagement length is also relatively small. As a result there is more than enough metal to metal clearance to permit washpipe 66 to articulate in response to dynamic runout of second conduit 6, and in response to static misalignment between conduit 4 and conduit 6.

Since housing cylindrical sealing surface 49 and washpipe external cylindrical sealing surface 76 are substantially equal in diameter, flexible seal 48 and resilient rotary seal 74 define substantially equal and opposite acting first and second pressure responsive areas (as described above), whereby opposed pressure induced hydraulic forces acting axially and oppositely on seal housing 4 are substantially balanced, and thus the seal housing 40 is not subject to substantial hydraulic loads that would otherwise interfere with motion, and is thus readily pivotally articulatable regardless of the pressure P1 of the fluid 78 or the Pressure P4 of the environment 90 so that seal housing 40 can pivot at flexible seal 48 in response to dynamic runout of second conduit 6, and in response to static misalignment between conduit 4 and conduit 6. Although the housing to pilot extrusion gap clearance at 69 is relatively small, the axial engagement length is also relatively small. As a result there is more than enough metal to metal clearance to permit the seal housing 40 to pivotally articulate in response to dynamic runout of second conduit 6, and in response to static misalignment between conduit 4 and conduit 6. Drilling swivels are subject to static misalignment and dynamic runout from eccentricity relating to normal operating and assembly clearances including bearing clearances, non-perpendicular shoulders, side loads, eccentric mounting diameters, out of roundness, etc.

Laboratory tests performed by the inventor have shown that resilient pressure retaining rotary seals can transfer substantial radial loads thus serving as radial bearings, and this phenomenon is exploited by the present invention. Resilient rotary seals 74, 82, and 84 and interior journal bearing surface 80 of seal housing 40 co-operate with washpipe external cylindrical sealing surface 76 to position second end 40*b* and middle portion 40*c* seal housing 40 in substantially concentric telescoped orientation with first end 66*a* and middle portion 66*c* of washpipe 66 as the washpipe 66 and seal housing 40 articulate in unison in response to dynamic runout of second conduit 6, and in response to static misalignment between conduit 4 and conduit 6. The flexibility of flexible seals 48 and 72 permits the seal housing 40 and the washpipe 66 to articulate in unison in response to dynamic runout of second conduit 6. Since the washpipe 66 and seal housing 40 articulate in unison in response to dynamic runout of second conduit 6, substantially no relative radial motion occurs between seal housing 40 and washpipe 66, which serves to minimize the extrusion damage which occurs to resilient rotary seals 74, 82, and 84, and which permits the minimum radial clearance between seal housing 40 and washpipe 66 which is necessary for maximum seal extrusion resistance. Additionally, the initial compression of the resilient rotary seals does not have to accommodate the dynamic runout of the second conduit 6 or the slope change of the washpipe 66, therefore less initial compression can be used, resulting in less initial seal to washpipe interfacial contact pressure, making the assembly more suitable for use with hydrodynamic seals. The minimal radial motion occurring between seal housing 40 and washpipe 66 also helps to minimize the wear which can be caused when abrasives become entrapped between closely fitted relatively rotating parts and crushed by radial motion.

The configuration of this invention is a distinct and novel improvement over the prior art of U.S. Pat. No. 5,195,754 because the seal housing 40 and the relatively rotating washpipe external cylindrical sealing surface 76 remain coaxial as they articulate in unison, which permits a close extrusion gap clearance to be maintained over the entire telescoping engagement between the seal housing 40 and the washpipe external cylindrical sealing surface 76, as is necessary for the multiple seals required for pressure staging. In the articulating seal carrier of U.S. Pat. No. 5,195,754, close extrusion gap clearance can only be provided over a short length (112 of FIG. 2 in U.S. Pat. No. 5,195,754) because a skew angle occurs between the axis of the seal carrier and the axis of the shaft. The skew angle which develops in the prior art arrangement of U.S. Pat. No. 5,195,754 can also promote abrasive impingement related seal wear in applications requiring substantial articulation because the direction of shaft rotation becomes increasingly skewed with respect to the seal track as the angle of articulation increases. The coaxial relationship between the seal housing and washpipe of the present invention also permits a journal bearing relationship to exist between the seal housing 40 and washpipe 66 over most or all of their telescoped length, unlike the articulating arrangement of U.S. Pat. No. 5,195,754.

Although a specific radial bearing arrangement including resilient rotary seals and journal bearing surfaces has been discussed to position second end 40*b* and middle portion 40*c* of seal housing 40 in substantially concentric orientation with first end 66*a* and middle portion 66*c* of washpipe 66, such is not intended to be in any way limiting of the scope of this invention. Other radial bearing arrangements may be incorporated in conjunction with the present invention without departing from the spirit or scope thereof. For example, needle roller bearings, cylindrical roller bearings, ball bearings, angular contact bearings, plastic journal bearings, or tapered roller bearings may be substituted for interior journal bearing surface 80.

The flexible seals 72 and 48 may conveniently take any suitable form, such as the multi-purpose plastic or elastomer bodied, O-Ring energized seals sold by Parker Seals under the registered trademark PolyPak. It should be noted, however, that other types of flexible seals, such as O-Rings, square rings, spring energized reinforced Teflon vee-rings, chevron seals, or metal bellows, can also be used without departing from the spirit or scope of this invention.

A grease seal 94 is supported and positioned by a frictional fit with washpipe retainer 56 and serves to protect internal shoulder 60, surface 62, internal polygonal geometry 68, external polygonal geometry 70, and flexible seal 72 from contaminants such as dust and water which may be present in environment 90. A grease fitting 96 is supplied so that grease can be injected to lubricate flexible seal 72, grease seal 94, internal shoulder 60, surface 62, internal polygonal geometry 68, and external polygonal geometry 70. The internal shoulder 60, surface 62, internal polygonal geometry 68, and external polygonal geometry 70 are positioned relative to flexible seal 72 so that internal shoulder 60, surface 62, internal polygonal geometry 68, and external polygonal geometry 70 are protected from the effect of abrasives and corrosives which may be present in fluid 78. Axial clearance 81 is also provided between washpipe 66 and second conduit 6 so that wear between the second end 66b of the washpipe and second conduit is prevented; if such wear were permitted it could result in an interlocking wear pattern between the washpipe and the second conduit which might inhibit the ability of washpipe 66 to freely articulate.

The resilient rotary seals 74, 82, and 84 may conveniently take the form of hydrodynamic seals such as those patented and sold by Kalsi Engineering, Inc. or any one of a number of rotary shaft seals which are suitable for the purposes intended, such as reinforced elastomeric chevron type seals which are conventionally used in many swivels. In the preferred embodiment, the resilient rotary seals 74, 82, and 84 are constructed in accordance with the principles of U.S. Pat. No. 4,610,319 and provide a hydrodynamic pumping action which lubricates and cools the dynamic rotary sealing interface between the resilient rotary seals 74, 82, and 84 and the washpipe external cylindrical sealing surface 76. Such a hydrodynamic seal is shown in FIG. 2 generally at 200. The hydrodynamic seal consists of a resilient generally circular body 202 which incorporates a projecting dynamic sealing lip 204 which has an inner peripheral dynamic sealing surface 206 which has a non-axially varying edge 210 and an axially varying hydrodynamic edge 208. The hydrodynamic edge 208 lubricates inner peripheral dynamic sealing surface 206 per the teaching of U.S. Pat. No. 4,610,319.

The dynamic sealing surface 206 is compressed against the washpipe external cylindrical sealing surface (76 on FIG. 1). The seal housing(40 in FIG. 1) holds the hydrodynamic seal in radial compression against the washpipe external cylindrical sealing surface, thereby initiating a static seal with the seal housing and washpipe. When relative rotation is not present, a liquid tight seal is maintained between the dynamic sealing lip 204 and the washpipe external cylindrical sealing surface.

When relative rotation takes place, the hydrodynamic seal remains stationary with respect to the housing, and maintains a static sealing interface with said housing, while the seal-to-washpipe interface becomes a dynamic sealing interface. The dynamic sealing lip incorporates a special geometry that promotes long seal life by hydrodynamically lubricating the dynamic seal-to-washpipe interfacial zone, and by excluding environmental contaminates from the seal to shaft interface. This special geometry consists of a wavy, axially varying edge 208 on the lubricant edge of the peripheral dynamic sealing surface 206 and a circular, abrupt non-axially varying edge 210 on the environmental edge of peripheral dynamic sealing surface 206 per the teachings of U.S. Pat. No. 4,610,319.

As relative rotation of the shaft takes place, the wavy, axially varying edge 208, which has a gradually converging relationship with the shaft, generates a hydrodynamic wedging action that introduces a lubricant film between the peripheral dynamic sealing surface 206 and the washpipe external cylindrical sealing surface (76 on FIG. 1) per described teachings of U.S. Pat. No. 4,610,319. This lubricant film physically separates the seal and the washpipe external cylindrical sealing surface, and thereby prevents the typical dry rubbing type wear and blistering heat damage associated with conventional non-hydrodynamic type seals, and thereby prolongs seal and washpipe surface life and makes higher service pressures and higher rotary speeds practical. The hydrodynamic inlet geometry can take any one of many suitable forms that result in a gradually converging, axially varying shape at the lubricant side of the dynamic sealing lip without departing from the spirit or scope of the present invention.

The abrupt circular corner 210 is not axially varying, and does not generate a hydrodynamic wedging action in response to relative rotary motion, and thereby functions to exclude particulate contaminants from the seal-to-washpipe interface per the teachings of U.S. Pat. No. 4,610,319. This exclusion function is only important on seal 74 of FIG. 1; seals 82 and 82 may have a hydrodynamic geometry at both ends of the dynamic sealing peripheral surface if desired.

In the preferred embodiment under typical conditions where P4 is negligible, the lubricant pressures P2 and P3 can be regulated in response to fluid pressure P1 by a pressure regulating lubricant reservoir such as shown generally at 300 in FIG. 3, which can be used to increase or decrease the lubricant pressure relative to the fluid pressure P1 depending on which end of the pressure regulating lubricant reservoir is connected to conduit 92 of FIG. 1.

The principle components of the pressure regulating lubricant reservoir, as shown in FIG. 3, are cylinder 302, blind cap 304, seal housing 306, piston 308, rod seal 310, piston seal 312, blind cap seal 314, cap seal 324, tie bolts 316 forming a bolt circle, nuts 318, and conduits 320 and 322. Blind cap seal 314 establishes a static seal between blind cap 304 and cylinder 302, and cap seal 324 establishes a static seal between seal housing 306 and cylinder 302. Piston seal 312 establishes a sliding seal between cylinder 302 and piston 308, and rod seal 310 establishes a sliding seal between piston 308 and seal housing 306 at sealing diameter 390.

In the case where it is desired that the lubricant pressure P2 is larger than that of the fluid pressure P1 for the reason stated above and the pressure P4 environment 90 is negligible, the conduit 92 of FIG. 1 is connected to conduit 320 of FIG. 3 thus communicating fluid pressure to sealed cylindrical region 328, and the flexible conduit 86 of FIG. 1 is connected to concduit 322 of FIG. 3 and sealed annular region 326 is filled with lubricant. Since the transverse area of sealed cylindrical region 328 is larger than the transverse area of sealed annular region 326, the lubricant pressure P2 is amplified above fluid pressure P1 by the ratio of the transverse area of sealed cylindrical region 328 divided by the transverse area of sealed annular region 326. The transverse area of sealed annular region 326 can be defined by defining sealing diameter 390. By defining the transverse area of sealed annular region 326 relative to the transverse area of sealed cylindrical region 328, the amplification of P2 above P1 can be defined. The projection 330 of piston 308 provides a means to measure the remaining lubricant volume.

In the case where it is desired that the lubricant pressure P2 is a fraction of the fluid pressure P1 for the reason stated above and the pressure P4 environment 90 is negligible, the conduit 92 of FIG. 1 is connected to conduit 322 of FIG. 3 thus communicating fluid pressure P1 to sealed cylindrical region 326, and the flexible conduit 86 of FIG. 1 is connected to conduit 320 of FIG. 3 and sealed annular region 328 is filled with lubricant. Since the transverse area of sealed cylindrical region 328 is larger than the transverse area of scaled annular region 326, the lubricant pressure P2 is de-amplified below fluid pressure P1 by the ratio of the transverse area of sealed cylindrical region 326 divided by the transverse area of sealed annular region 328. Likewise, a second such pressure regulating lubricant reservoir can be installed to regulate lubricant Pressure P3 to be a fraction of fluid pressure P1 or a fraction of lubricant pressure P2. Any number of pressure regulating lubricant reservoirs can be used if desired so that any magnitude of pressure differential between fluid pressure P1 and environment pressure P4 can be accommodated by providing a suitable number of pressure stages. The de-amplification provided can be controlled by defining the transverse area of sealed annular region 326 relative to the transverse area of sealed cylindrical region 328.

Although a specific means of providing staged pressure at fractions of P1 is described, such is not intended to limit the scope of the invention, which admits to other equally effective means of producing pressure staging. For example, the pressure of fluid 78 could be sensed by a pressure transducer, which could provide a signal to pumps which control stage pressure. For another example, the sealed regions between the rotary seals could be pre-charged with stage pressure, such as with gas over oil accumulators. Where non-hydrodynamic seals are used as the resilient rotary seals, the staging means such as shown in FIG. 3 would not have to accommodate lubricant leakage related to hydrodynamic sealing, and could therefore be miniaturized so as to be mounted directly to the seal housing without the use of flexible conduits.

Although a specific number of stages are shown and discussed in regard to FIG. 1, such is not intended to limit the scope of the invention, which can use any number of stages if desired.

DESCRIPTION OF THE ALTERNATIVE EMBODIMENT REPRESENTED BY FIG. 4

FIG. 4 illustrates a simplified alternate embodiment of the present invention which is identical in function to the preferred embodiment shown in FIG. 1 and discussed above, except that the resilience rotary seals 474, 482 and 484 in seal housing 440 are employed in a redundant manner rather than a pressure staged manner, and means 498 such as grease fittings are proviided for injecting grease into seal housing 440 for the purpose of lubricating resilient rotary seals 474, 482 and 484. The resilient rotary seals 474, 482 and 484 may take any suitable form, such as hydrodynamic type or chevron type seals. As with the preferred embodiment, the flexibility of flexible seals 448 and 472 permits the seal housing 440 and the washpipe 466 to articulate in unison in response to dynamic runout of second conduit 406. Since the washpipe 466 and seal housing 440 articulate in unison in response to dynamic runout of second conduit 406, substantially no relative radial motion occurs between seal housing 440 and washpipe 466. While this simplified alternate embodiment does not provide the full benefit of the preferred embodiment because of the lack of pressure staging, it never-the-less provides a significant improvement over existing designs due to the simultaneous articulation of the seal housing 440 and washpipe 466. The washpipe retainer is shown in simplified form which omits the grease seal which was portrayed in FIG. 1. The washpipe pilot 450 and adapter ring 451 are identical to those portrayed in FIG. 1. The housing incorporates means to position and support resilient rotary seals, such as the grooves 441 shown which contain resilient rotary seals 474, 482 and 484.

It can be readily appreciated that in the embodiment of FIG. 4 the position of the seal housing 440 and the washpipe 466 can be easily reversed if desired so that the seal housing 440 has relative rotation with respect to frame 408 and the washpipe 466 is not rotatable relative to frame 408. All that is required to accomplish the reverse position is to attach housing pilot 426 to second conduit 406, and to attach washpipe pilot 450 and adapter ring 451 to first conduit 404.

It can also be appreciated that the embodiment of FIG. 4 offers substantial simplification compared to the embodiment of FIG. 1 because the equipment required for pressure staging has been omitted.

DESCRIPTION OF THE ALTERNATIVE EMBODIMENT REPRESENTED BY FIG. 5

A simplified alternate embodiment of the present invention, which provides the pressure staging of the preferred embodiment without a pressure-balanced articulating housing, is shown generally at 502 in FIG. 5. The invention is intended to be used to conduct a pressurized fluid such as a liquid or gas between a first conduit 504 and a second conduit 506 which is approximately coaxial with first conduit 504 and has relative rotation with respect to first conduit 504, and which may have dynamic runout and static offset relative to first conduit 504.

To aid in understanding the present invention a fragmentary longitudinal section of a drilling swivel is shown in FIG. 5 which includes a frame 508, second conduit 506, bearings 510, oil seal 512, and oil seal housing 514. Frame 508 incorporates a first end shown generally at 508a and a second end shown generally at 508b. The first end 508a incorporates first conduit 504, and second end 508b incorporates bearing housing portion 520 which provides radial and axial support to bearings 510, which in turn provide radial and axial support to second conduit 506 to support second conduit 506 for rotation with respect to frame 508. Oil Seal 512 is supported and positioned by oil seal housing 514, retains oil within bearing housing portion 520 to lubricate bearings 510 and to protect them from contaminant matter present in environment 590. Oil seal housing 514 is retained by threaded fastener 522 is sealed with respect to bearing housing portion 520 by virtue of seal 524.

An adapter ring 501 is fixedly attached to first conduit 504 by threaded means 503 which may take any suitable form. Seal housing 540 is fixedly attached to adapter ring 501 by any suitable means such as a circle of bolts 505, and has a sealed relationship with first conduit 504 by virtue of seal 507. Seal housing 540 can be adjusted laterally with respect to first conduit 504 when circle of bolts 505 is loosened, thus providing a means to align rotary seal housing 540 with second conduit 506 in order to accommodate for static misalignment between first conduit 504 and second conduit 506. Oversized bolt clearance holes 509 are provided in seal housing 540 to permit the seal housing 540 to be adjusted to a position which is aligned to second conduit 506 while being eccentric to adapter ring 501. Housing pilot 426 and seal housing 540 can be angularly adjusted to position flexible conduits 586, 588 and 592.

Adapter ring 551 is attached to second conduit 506 by threaded means 552 which can take any suitable form. Washpipe pilot 550 is attached to adapter ring 551 by threaded means 553 which may take any suitable form such as a pattern of bolts, and has a sealed relationship with second conduit 6 by virtue of seal 554. Washpipe retainer 556 is attached to washpipe pilot 550 by threaded means 558, which may be a circle of bolts as shown or other suitable means. Internal shoulder 560 of washpipe retainer 556 and surface 562 of washpipe pilot 550 cooperate together to capture rim 564 of washpipe 566 and thereby axially position washpipe 566.

Internal geometry 568 of washpipe pilot 550 interlocks with external geometry 570 of rim 564 and thereby rotationally connects washpipe 566 to washpipe pilot 550. Any interlocking geometry, such as splines or a drive pin and mating slot, or a tang and mating slot, may also be used to rotationally connect washpipe 566 to washpipe pilot 550 without departing from the spirit or scope of the present invention. Washpipe 566 has a sealed relationship with washpipe pilot 550 by virtue of flexible seal 572, which establishes a sealing interface with washpipe 566 at washpipe cylindrical sealing surface 573 and positions the second e nd 566b of washpipe 566 in approximately concentric orientation with washpipe pilot 550. Washpipe pilot 550 is piloted to second conduit 506 at 557.

Since washpipe 566 is rotationally connected to washpipe pilot 550, and seal housing 540 is fixedly attached to adapter ring 501, washpipe 566 has relative rotation with respect to seal housing 540 whenever second conduit 506 has relative rotation with respect to first conduit 504.

Seal housing 540 has a sealed relationship with washpipe 566 by virtue of resilient rotary seal 574, which establishes a dynamic rotary sealing interface with washpipe 566 at washpipe external cylindrical sealing surface 576 and thereby prevents the escape of fluid 578 which is at pressure P1. Resilient rotary seals 582 and 584 are provided which also establish respective dynamic rotary sealing interfaces with washpipe 566 at washpipe external cylindrical sealing surface 576. Resilient rotary seals 574, 582 and 584 also serve as bearing means to position first end 566a of washpipe 566 in approximately concentric orientation with seal housing 540. A lubricant at pressure P2 is introduced through flexible conduit 586 to the sealed annular region between resilient rotary seal 574 and resilient rotary seal 582, and a lubricant at pressure P3 is introduced through flexible conduit 588 to the sealed annular region between resilient rotary seal 582 and resilient rotary seal 584. The pressures P2 and P3 are staged so that the pressure difference between fluid 578 and environment 590 is divided among two or more of the resilient rotary seals 574, 582 and 584, as described previously in conjunction with FIG. 1. The housing incorporates means to position and support resilient rotary seals, such as the grooves 541 shown which cortain resilient rotary seals 574, 582 and 584.

Since washpipe cylindrical sealing surface 573 and washpipe external cylindrical sealing surface 576 are substanrtially equal in diameter, resilient rotary seal 574 and flexible seal 572 define substantially equal and opposite acting pressure responsive areas, whereby opposed pressure induced hydraulic forces acting axially and oppositely on washpipe 566 are substantially balanced and thus the washpipe 566 is substantially free-floating and is thus readily pivotally articulatable regardless of the pressure of the fluid 578 or the environment 590 so that the washpipe 566 can pivot at flexible seal 572 in response to dynamic runout of second conduit 506, and in response to static misalignment between conduit 504 and conduit 506.

Resilient rotary seals 574, 582, and 584 co-operate with washpipe external cylindrical sealing surface 576 to position first end 566a of washpipe 566 as the washpipe 566 pivotally articulates in response to dynamic runout of second conduit 506, and in response to static misalignment between conduit 504 and conduit 506. The flexibility of flexible seal 572 permits the w washpipe 566 to articulate in response to dynamic runout of second conduit 506. Since the washpipe 566 articulates in response to dynamic runout of second conduit 506, little radial motion occurs between seal housing 540 and first end 566a of washpipe 566, which serves to minimize the extrusion damage which occurs to resilient rotary seals 574, 582, and 584, and which permits the small radial clearance between seal housing 540 and ,vashpipe 566 which is necessary for maximum seal extrusion resistance.

The flexible seal 572 may conveniently take any suitable form, as discussed in conjunction with FIG. 1. To minimize the articulation induced skew between the washpipe 576 and the seal housing 540, the axial distance 519 between flexible seal 572 and the environment side resilient rotary seal 584 should be at least twice that of the axial distance 529 between the environment side resilient rotary seal 584 and the fluid side resilient rotary seal 574.

Grease seal 594 is supported and positioned by washpipe retainer 556 and protects internal shoulder 560, surface 562, internal geometry 568, external geometry 570, and flexible seal 572 from contaminants present in environment 590. A grease fitting is supplied so that grease can be injected to lubricate flexible seal 572, grease seal 594, internal shoulder 560, surface 562, internal polygonal geometry 568, and external polygonal geometry 570. Internal shoulder 560, surface 562, internal geometry 568, and external geometry 570 are positioned relative to flexible seal 572 so that they are protected by flexible seal 572 from fluid 578.

The resilient rotary seals 574, 582, and 584 may be any one of a number of rotary shaft seals which are suitable or the purposes intended, and may conveniently take the form of hydrodynamic seals such as shown in FIG. 2 which provide a hydrodynamic pumping action which lubricates the dynamic rotary sealing interface between the resilient rotary seals 574, 582, and 584 and the washpipe external cylindrical sealing surface 576, and provides cooler operation compared to non-hydrodynamic seals. In non-hydrodynamic seals, the seal generated heat is the result of direct seal to washpipe rubbing, and is so severe that it can cause the elastomer to blister and melt.

DESCRIPTION OF THE ALTERNATIVE EMBODIMENT REPRESENTED BY FIG. 6

An alternate embodiment of the present invention is shown in FIG. 6 which differs slightly from the embodiment shown in FIG. 5 in terms of component mounting. An adapter ring 601 is secured to first conduit 604 by threads 603. The pressure staged seal housing 640 is piloted to first conduit 604 at 691 and retained to adapter ring by circle of bolts 605.

A washpipe pilot 650 is piloted to second conduit 606 at 657 and clamped to second conduit 606 by washpipe retainer 656. Washpipe retainer 656 is retained to second conduit 606 by threads 652.

DESCRIPTION OF THE ALTERNATIVE EMBODIMENT REPRESENTED BY FIG. 7

An alternate embodiment of the invention is shown in FIG. 7 which differs slightly from the embodiment shown in FIG. 1 in terms of component mounting. An adapter ring 701 is secured to first conduit 704 by threads 703. The housing pilot 726 is pilot to first conduit 704 at 791 and is retained to adapter ring 701 by circle of bolts 728. Instead of the 3 resilient rotary seals of FIG. 1, the embodiment of FIG. 7 is provided with 4 resilient rotary seals, 774, 782, 784, and 785 which provide an extra pressure stage compared to the embodiment of FIG. 1. The articulating rotary housing 740 is provided with 3 flexible conduits 786, 788 and 789. Flexible conduit 786 communicates stage pressure to the region between resilient rotary seals 774 and 782, flexible conduit 788 communicates stage pressure to the region between resilient rotary seals 782 and 784, and flexible conduit 789 communicates stage pressure to the region between resilient rotary seals 784 and 785. The housing incorporates means to position and support resilient rotary seals, such as the grooves 741 shown which contain resilient rotary seals 774, 782, 784 and 785. As will be apparent to those skilled in the art, the present invention may be produced in other specific forms without departing from its spirit or essential characteristics. The present embodiments are therefore to be considered as illustrative and not restrictive.

We claim:

1. A pressure balanced rotary seal assembly for conducting a fluid having a fluid pressure between the first and second conduits of a swivel apparatus having a frame supporting the first and second conduits in relatively rotatable axially spaced relation, comprising:

(a) a washpipe of elongate, generally tubular form, having a first washpipe end for facing the first conduit and a second washpipe end for facing the second conduit, said washpipe defining an external generally cylindrical sealing surface;

(b) a seal housing of generally tubular form having a first housing end having a housing flexible seal for establishing a housing flexible sealing interface with the first conduit and thereby defining a first seal housing pressure responsive area and having a second housing end for facing the second conduit and being disposed about said first washpipe end, said seal housing supporting at least one rotary seal in rotatable sealing engagement with said external generally cylindrical sealing surface and defining a second seal housing pressure responsive area substantially equal and opposed to said first seal housing pressure responsive area such that opposed pressure induced hydraulic forces acting axially and oppositely on said seal housing are substantially balanced and thus said seal housing being readily pivotally articulatable about said housing flexible sealing interface and also defining a first washpipe pressure responsive area substantially equal to said first and second seal housing pressure responsive areas; and (c) a washpipe flexible seal for sealing engagement with said washpipe and the second conduit and for establishing a washpipe flexible sealing interface therewith and thereby defining a second washpipe pressure responsive area being substantially equal and opposed to said first washpipe pressure responsive area, such that opposed pressure induced hydraulic forces acting axially and oppositely on said washpipe are substantially balanced and said washpipe thus being readily pivotally articulatable about said washpipe flexible sealing interface in unison with said seal housing at all conditions of fluid pressure.

2. The pressure balanced rotary seal assembly of claim 1, wherein:

(a) said at least one rotary seal being a plurality of rotary seals, and (b) pressure dividing means dividing the fluid pressure among said plurality of rotary seals.

3. The pressure balanced rotary seal assembly of claim 2, said pressure dividing means having at least one pressure regulating reservoir, comprising:

(a) at least one hydraulic cylinder;

(b) a piston movably disposed within said at least one hydraulic cylinder and defining first and second sealed chambers and defining differing pressure responsive hydraulic areas establishing an area ratio therebetween, and (c) a first pressure communication passage supplying a first pressure to said first sealed chamber and a second pressure communication passage conducting a second pressure from said second sealed chamber at a pressure differing from said first pressure.

4. The pressure balanced rotary seal assembly of claim 2 wherein:

(a) at least one of said plurality of rotary seals being a hydrodynamic seal having a generally circular body incorporating a projecting dynamic sealing lip having an inner peripheral dynamic sealing surface establishing said rotatable sealing engagement with said external generally cylindrical sealing surface;

(b) a lubricant being located within the housing and in contact with said hydrodynamnic seal; and (c) said inner peripheral dynamic sealing surface having an axially varying hydrodynamic edge which generates lubricant wedging activity responsive to relative rotation of said external generally cylindrical sealing surface which introduces a film of lubricant between said inner peripheral dynamic sealing surface and said external generally cylindrical sealing surface for lubricating said inner peripheral dynamic sealing surface.

5. The pressure balanced rotary seal assembly of claim 2 comprising:

bearing means establishing guiding engagement between said seal housing and said washpipe and positioning said second housing end of said seal housing in substantially concentric orientation with said first washpipe end of said washpipe.

6. The pressure balanced rotary seal assembly of claim 1 wherein:

(a) said at least one rotary seal being a hydrodynamic seal having a generally circular body and incorporating a projecting dynamic sealing lip having an inner peripheral dynamic sealing surface establishing said rotatable sealing engagement with said external generally cylindrical sealing surface;

(b) a lubricant being located within the housing and in contact with said hydrodynamic seal; and (c) said inner peripheral dynamic sealing surface having an axially varying hydrodynamic edge which generates lubricant wedging activity responsive to relative rotation of said external generally cylindrical sealing surface which introduces a film of lubricant between said inner peripheral dynamic sealing surface and said external generally cylindrical sealing surface for lubricating said inner peripheral dynamic sealing surface.

7. The pressure balanced rotary seal assembly of claim 1 wherein said at least one rotary seal being a plurality of rotary seals employed redundantly.

8. The pressure balanced rotary seal assembly of claim 7 comprising:

(a) a housing retainer for securing said seal housing in rotationally fixed relation with the frame and;

(b) a washpipe retainer for securing said washpipe to the second conduit in rotatable relation with the frame.

9. The pressure balanced rotary seal assembly of claim 7 comprising:

(a) a housing retainer for securing said seal housing to the first conduit in rotatable relation with the frame; and (b) a washpipe retainer for securing said washpipe to the second conduit in non-rotatable relation with the frame.

10. The pressure balanced rotary seal assembly of claim 7 comprising:

bearing means establishing guiding engagement between said seal housing and said washpipe and positioning said second housing end of said seal housing in substantially concentric orientation with said first washpipe end of said washpipe.

11. The pressure balanced rotary seal assembly of claim 1 comprising:
   (a) a housing retainer for retaining said seal housing to the first conduit in rotationally fixed relation to the frame; and
   (b) a washpipe retainer for retaining said washpipe to the second conduit in rotatable relation to the frame.

12. The pressure balanced rotary seal assembly of claim 1 comprising:
   (a) a housing retainer for retaining said seal housing to the first conduit in rotatable relation to the frame; and
   (b) a washpipe retainer for retaining said washpipe to the second conduit in rotationally fixed relation to the frame.

13. The pressure balanced rotary seal assembly of claim 1 comprising:
   bearing means establishing guiding engagement between said seal housing and said washpipe and positioning said second housing end of said seal housing in substantially concentric orientation with said first washpipe end of said washpipe.

14. The pressure balanced rotary seal assembly of claim 13 wherein said bearing means being defined by said at least one rotary seal.

15. The pressure balanced rotary seal assembly of claim 13 wherein said bearing means being a journal bearing.

16. A rotary seal assembly for conducting a fluid having a fluid pressure between the first and second conduits of a swivel apparatus having a frame supporting the first and second conduits in relatively rotatable axially spaced relation, comprising:
   (a) a washpipe of generally tubular form having a first washpipe end for facing the first conduit, and a second washpipe end for facing the second conduit, and having an external generally cylindrical sealing surface;
   (b) a seal housing of generally tubular form having a first housing end for facing the first conduit and having a housing flexible seal for establishing a housing flexible sealing interface with the first conduit and said seal housing and thereby defining a first seal housing pressure responsive area, and having a second housing end for facing the second conduit and telescoping over said first washpipe end, a plurality of rotary seals positioned within said seal housing in rotatable sealing engagement with said external generally cylindrical sealing surface, said plurality of rotary seals defining a second seal housing pressure responsive area substantially equal and opposed to said first seal housing pressure responsive area such that opposed pressure induced hydraulic forces acting axially and oppositely on said seal housing are substantially balanced such that said seal housing being substantially free of axially acting hydraulic loads and thus being readily pivotally articulatable about said housing flexible sealing interface at all conditions of fluid pressure, said plurality of rotary seals defining a first washpipe pressure responsive area substantially equal to said first and second seal housing pressure responsive area;
   (c) a washpipe flexible seal for sealing engagement with said washpipe and the second conduit and for establishing a washpipe flexible sealing interface with the second conduit and thereby defining a second washpipe pressure responsive area being substantially equal and opposed to said first washpipe pressure responsive area, such that opposed pressure induced hydraulic forces acting axially and oppositely on said washpipe being substantially balanced such that the washpipe being substantially free of axially acting hydraulic loads and thus being readily pivotally articulatable about said washpipe flexible sealing interface in unison with said seal housing at all fluid pressure conditions;
   (d) pressure dividing means dividing the fluid pressure among said plurality of rotary seals; and
   (e) bearing means establishing guiding engagement between said seal housing and said washpipe and positioning said second end of said seal housing in substantially concentric orientation with said first end of said washpipe.

17. The rotary seal assembly of claim 16, said pressure dividing means having at least one pressure regulating reservoir, comprising:
   (a) at least one hydraulic cylinder,
   (b) a piston movably disposed within said at least one hydraulic cylinder and defining first and second sealed chambers and defining differing pressure responsive hydraulic areas establishing an area ratio therebetween; and
   (c) a first pressure communication passage supplying a first pressure to said first sealed chamber and a second pressure communication passage conducting a second pressure from said second sealed chamber at a pressure differing from said first pressure.

18. The rotary seal assembly of claim 16 wherein:
   (a) at least one of said plurality of rotary seals being a hydrodynamic seal having a generally circular body incorporating a projecting dynamic sealing lip having an inner peripheral dynamic sealing surface establishing said rotatable sealing engagement with said external generally cylindrical sealing surface;
   (b) a lubricant being located within the housing and in contact with said hydrodynamic seal; and
   (c) said inner peripheral dynamic sealing surface having an axially varying hydrodynamic edge which generates lubricant wedging activity responsive to relative rotation of said external generally cylindrical sealing surface which introduces a film of lubricant between said inner peripheral dynamic sealing surface and said external generally cylindrical sealing surface for lubricating said inner peripheral dynamic sealing surface.

19. The rotary seal assembly of claim 16 comprising:
   (a) a housing retainer for retaining said seal housing to the first conduit in rotationally fixed relation to the frame and to the first conduit; and
   (b) a washpipe retainer for retaining said washpipe to the second conduit in rotatable relation with the frame.

20. The rotary seal assembly of claim 16 comprising:
   (a) a housing retainer for retaining said seal housing to the first conduit in rotatable relation with the frame; and
   (b) a washpipe retainer for retaining said washpipe to the second conduit in non-rotatable relation with the frame.

21. The rotary seal assembly of claim 16, wherein said bearing means being defined by said at least one of said plurality of rotary seals.

22. The rotary seal assembly of claim 16, wherein said bearing means being a journal bearing.

23. A rotary seal assembly for conducting a fluid having a fluid pressure between the first and second conduits of a swivel apparatus having a frame supporting the first and second conduits in relatively rotatable axially spaced relation, comprising:
- (a) a washpipe of elongate, generally tubular form having a first washpipe end for facing the first conduit and a second washpipe end for facing the second conduit, said washpipe defining an external generally cylindrical sealing surface;
- (b) a seal housing of generally tubular form having a first housing end for facing the first conduit and having a housing seal for establishing a sealing interface with the first conduit and said seal housing, and having a second housing end for facing the second conduit and telescoping over said first washpipe end;
- (c) a plurality of rotary seals located within said seal housing and having rotatable sealing engagement with said external generally cylindrical sealing surface and defining a first washpipe pressure responsive area;
- (d) a washpipe flexible seal for sealing engagement with said washpipe and the second conduit and for establishing a washpipe flexible sealing interface with the second conduit and thereby defining a second washpipe pressure responsive area being substantially equal and opposed to said first washpipe pressure responsive area, such that opposed pressure induced hydraulic forces acting axially and oppositely on said washpipe being substantially balanced and said washpipe being substantially free of axially acting hydraulic loads and thus being readily pivotally articulatable about said washpipe flexible sealing interface at all conditions of fluid pressure;
- (e) pressure dividing means dividing the fluid pressure among said plurality of rotary seals.

24. The rotary seal assembly of claim 23, wherein said pressure dividing means having at least one pressure regulating reservoir, comprising:
- (a) at least one hydraulic cylinder;
- (b) a piston movably disposed within said at least one hydraulic cylinder and defining first and second hydraulic chambers and defining differing pressure responsive hydraulic areas establishing an area ratio therebetween; and
- (c) a first pressure communication passage supplying a first pressure to said first hydraulic chamber and a second pressure communication passage conducting a second pressure from said second hydraulic chamber at a pressure differing from said first pressure.

25. The rotary seal assembly of claim 23 wherein at least one of said plurality of rotary seals being a hydrodynamic seal comprising:
- (a) generally circular body having a projecting dynamic sealing lip defining an inner peripheral dynamic sealing surface establishing said rotatable sealing engagement with said external generally cylindrical sealing surface;
- a lubricant being located within said housing and in contact with said hydrodynamic seal; and
- (c) said inner peripheral dynamic sealing surface having an axially varying hydrodynamic edge which generates lubricant wedging activity responsive to relative rotation of said external generally cylindrical sealing surface which introduces a film of lubricant between said inner peripheral dynamic sealing surface and said external generally cylindrical sealing surface for lubricating said inner peripheral dynamic sealing surface.

26. The rotary seal assembly of claim 23 comprising:
- (a) housing retaining means for securing said seal housing to the first conduit in non-rotatable relation with the frame; and
- (b) washpipe retaining means for securing said washpipe to the second conduit in rotatable relation with the frame.

27. The rotary seal assembly of claim 23 comprising:
- (a) housing retaining means for securing said seal housing to the first conduit in rotatable relation with the frame; and
- (b) washpipe retaining means for securing said washpipe to the second conduit in rotationally fixed relation with the frame.

28. The rotary seal assembly of claim 23, comprising:
bearing means establishing guiding engagement between said washpipe and said seal housing and positioning said first washpipe end of said washpipe in substantially concentric orientation with said seal housing.

29. The rotary seal assembly of claim 28 wherein said plurality of rotary seals being in compressed engagement with said external generally cylindrical sealing surface and defining said bearing means.

30. A fluid conducting swivel assembly, comprising:
- (a) a frame supporting a first conduit in fixed relation therewith and defining a bearing housing having conduit support bearings therein;
- (b) a second conduit having a part thereof located within said bearing housing and being rotatably supported by said conduit support bearings;
- (c) a washpipe being secured in relation with said second conduit by washpipe retaining means and being rotatable along with said second conduit, said washpipe defining a generally cylindrical sealing surface externally thereof;
- (d) a washpipe seal having sealing engagement with said washpipe and said second conduit and establishing a washpipe sealing interface therewith;
- (e) a seal housing secured in non-rotatable relation with said first conduit by housing retaining means with a part of said seal housing disposed in telescoping relation about said generally cylindrical sealing surface of said washpipe, said washpipe and said seal housing and said first and second conduits being disposed in substantial axial alignment and defining a flow passage for a fluid having a fluid pressure;
- (f) a plurality of hydrodynamic sealing elements being carried within said seal housing and having a sealing interface with said generally cylindrical sealing surface, said plurality of hydrodynamic sealing elements defining sealed lubricant containing regions with said washpipe and seal housing;
- (g) said plurality of hydrodynamic sealing elements having hydrodynamic geometry thereon causing hydrodynamic wedging of lubricant into said sealing interface thereof with said generally cylindrical sealing surface in response to relative rotation of said generally cylindrical sealing surface to thus maintain a film of lubricant within said sealing interface; and
- (h) means dividing said fluid pressure among said sealed lubricant containing regions.

* * * * *